(12) United States Patent
Wang et al.

(10) Patent No.: US 6,491,740 B1
(45) Date of Patent: Dec. 10, 2002

(54) METALLO-ORGANIC POLYMERS FOR GAS SEPARATION AND PURIFICATION

(75) Inventors: Qing Min Wang, North Plainfield, NJ (US); Dongmin Shen, Berkeley Heights, NJ (US); Martin Bülow, Basking Ridge, NJ (US); Miu Ling Lau, Edison, NJ (US); Frank R. Fitch, Bedminster, NJ (US); Shuguang Deng, Somerville, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/613,735

(22) Filed: Jul. 11, 2000

Related U.S. Application Data
(60) Provisional application No. 60/145,123, filed on Jul. 22, 1999.

(51) Int. Cl.[7] .................... B01D 53/02; B01D 53/047; B01J 20/00
(52) U.S. Cl. .................... 95/90; 95/96; 95/116; 95/117; 95/121; 95/126; 95/129; 95/139; 95/140; 95/143; 95/144; 95/148; 95/900; 502/400; 502/401; 502/406
(58) Field of Search .................... 96/108, 134; 95/90, 95/95, 96, 106, 116, 117, 121, 126, 129, 139, 143, 148, 900, 902, 140, 144; 502/401, 402, 406, 414

(56) References Cited

U.S. PATENT DOCUMENTS

| | | | | |
|---|---|---|---|---|
| 2,659,711 A | * | 11/1953 | Wilkins | 528/220 |
| 3,192,236 A | | 6/1965 | O'Connell | |
| 4,769,047 A | * | 9/1988 | Dye | 95/139 |
| 5,531,809 A | * | 7/1996 | Golden et al. | 95/101 |
| 5,648,508 A | * | 7/1997 | Yaghi | 556/9 |
| 5,795,553 A | * | 8/1998 | Lott et al. | 423/213.2 |
| 6,033,461 A | * | 3/2000 | Yang et al. | 95/129 |
| 6,106,593 A | * | 8/2000 | Golden et al. | 95/129 |

FOREIGN PATENT DOCUMENTS

| | | |
|---|---|---|
| EP | 0 727 608 A2 | 8/1996 |
| EP | 0 904 825 A2 | 3/1999 |
| EP | 1 070 538 A2 * | 1/2001 |
| GB | 939 191 | 10/1961 |
| WO | WO 99/05151 * | 2/1999 |

OTHER PUBLICATIONS

Jung Soo Seo, Dongmok Whang, Hyoyoung Lee, Sung Im Jun, Jinho Oh, Young Jin Jeon & Kimoon Kim, "A Homochiral Metal—Organic Porous Materials for Enantioselective Separation and Catalysis", Nature, vol. 404, Apr. 27, 2000, pp. 982–986.

(List continued on next page.)

*Primary Examiner*—Duane Smith
*Assistant Examiner*—Jason M. Greene
(74) *Attorney, Agent, or Firm*—Philip H. Von Neida; Salvatore P. Pace

(57) ABSTRACT

The present invention provides for methods and compositions for gas separation and purification utilizing a metallo-organic polymer adsorbent in processes for separating carbon dioxide, water, nitrogen oxides and hydrocarbons from gas streams. The metallo-organic polymer adsorbent composition has the formula:

$$[R(L)_n]_m M_n,$$

wherein R represents an organic spacer selected from the group consisting of an organic cyclic or acyclic compound; L represents a ligation group substituted on the organic spacer selected from the group consisting of carboxylate group, —C(=O)O⁻; dithiocarboxylate group, —C(=S)S⁻; and β-diketonate group, —C(=O)C(R')=C(—O⁻)—, wherein R'=H, or an aliphatic or aromatic group; M represents a transition metal or a rare earth metal selected from the group consisting of I to VIIB and VIII metals; m is the oxidation state of transition metal; and n is the number of the ligation group substituted on the organic spacer.

4 Claims, 5 Drawing Sheets

OTHER PUBLICATIONS

Stephen S.-Y. Chui, Samuel M.-F. Lo, Jonathan P.H. Charmant, A. Guy Orpen and Ian D. Williams, A Chemically Functionalizable Nanoporous Material $[Cu_3(TMA)_2(H_2O)_3]_n$, Feb. 19, 1999, vol. 283, Science, pp. 1148–1150.

Mohamed Eddaoudi, Hailian Li, Theresa Reineke, Michael Fehr, Douglas Kelley, Thomas L. Groy and O. M. Yaghi, "Design and Synthesis of Metal–Carboxylate Frameworks with Permanent Microporosity", Topics in Catalysis 9 (1999) pp. 105–111.

Omar M. Yaghi, Hailian Li, Charles Davis, David Richardson and Thomas L. Groy, "Synthetic Strategies, Structure Patterns, and Emerging Properties in the Chemistry of Modular Porous Solids", Accounts of Chemical Research, vol. 31, No. 8, 1998, pp. 474–484.

Hailian Li, Mohamed Eddaoudi, M. O'Keeffe and O. M. Yaghi, "Design and Synthesis of an Exceptionally Stable and Highly Porous Metal–Organic Framework", Nature, vol. 402, Nov. 18, 1999, pp. 276–279.

O. M. Yaghi, Guangming Li and Hailian Li, "Selective Binding and Removal of Guests in a Microporous Metal–Organic Framework", Nature, vol. 378, Dec. 14, 1995, pp. 703–706.

O. M. Yaghi, Guangming Li and Hailian Li, "Crystal Growth of Extended Solids by Nonaqueous Gel Diffusion", Chem. Mater. vol. 9, No. 5, 1997, 1074–1076.

Theresa M. Reineke, Mohamed Eddaoudi, M. O'Keeffe, and Omar M. Yaghi, "A Microporous Lanthanide–Organic Framework", Angew. Chem. Int. Ed. 1999, vol. 38, No. 17, pp. 2590–2594.

Theresa M. Reineke, Mohamed Eddaoudi, Michael Fehr, Douglas Kelley and O. M. Yaghi, "From Condensed Lanthanide Coordination Solids to Microporous Frameworks Having Accessible Metal Sites", J. Am. Chem. Soc., 1999, vol. 121, No. 8, pp. 1651–1657.

O. M. Yaghi, Charles E. Davis, Guangming Li and Hailian Li, "Selective Guest Binding by Tailored Channels in a 3-D Porous Zinc(II)—Benzenetricarboxylate Network", J. Am. Chem. Soc., 1997, vol. 119, No. 12, pp. 2861–2868.

Omar M. Yaghi, Guangming Li and Thomas L. Gray, "Conversion of Hydrogen–Bonded Manganese(II) and Zinc(II) Squarate ($C_4O_4^{2-}$)Molecules, Chains and Sheets to Three–Dimensional Cage Networks", J. Chem. Soc. Dalton Trans. 1995, pp. 727–732.

Omar M. Yaghi, Ryan Jernigan, Hailian Li, Charles E. Davis and Thomas L. Groy, "Construction of a New Open–Framework Solid from 1,3,5–cyclohexane–tricarboxylate and Zinc(II) Building Blocks", J. Chem. Soc., Dalton Trans., 1997 pp. 2383–2384.

O. M. Yaghi, Guangming Li and T. L. Groy, "Preparation of Single Crystals of Coordination Solids in Silica Gels: Synthesis and Structure of $CU^{II}(1,4-C_4H_4N_2)(C_4O_4)(OH_2)_4$", Journal of Solid State Chemistry, 117, pp. 256–260(1995).

Hailian Li, Mohamed Eddaoudi, Thomas L. Groy and O. M. Yaghi, Establishing Microporosity in Open Metal—Organic Frameworks: Gas Sorption Isotherms for Zn(BDC) (BDC=, 4–Benzenedicarboxylate), J. Am. Chem. Soc., 1998, vol. 120, pp. 8571–8572.

O. M. Yaghi, Hailian Li, Mohamed Eddauodi, T. L. Groy, "Designing Ordered Arrays of Lewis Acid Sites in Microporous Metal–Organic Materials," Supramolecular Design and Discovery Group, Dept. of Chemistry & biochemistry, Arizona State Univ., PO Box 871604, Tempe, AZ 85287–1604 *abstract*.

* cited by examiner

METALLO-ORGANIC POLYMERS FOR GAS SEPARATION AND PURIFICATION

This application claims priority from Provisional Patent Application No. 60/145,123 filed Jul. 22, 1999.

FIELD OF THE INVENTION

This invention relates to a new class of microporous adsorbents for gas separation and purification. For example, the novel adsorbents of the present invention may be used in pressure swing adsorption (PSA) or thermal swing adsorption (TSA) PPU (Pre-purification Unit) for removal of $CO_2$, $H_2O$, $N_2O$, and oil vapor from air streams prior to cryogenic air distillation, hydrocarbons/$CO_2$ separations, and syngas separations. In particular, the present invention relates to novel microporous metallo-organic adsorbents having pore sizes and pore volumes that are appropriate for gas separation and purification.

BACKGROUND OF THE INVENTION

Presently, numerous microporous materials that are mainly based on zeolites, other zeo-type inorganic solids, various types of activated carbon, such as carbon molecular sieves and super-activated carbons, are being used as solid adsorbents for gas separation and purification. Zeolites are porous crystalline aluminosilicates, whose framework is constructed by $SiO_4$ and $AlO_4$ tetrahedra, which are joined together in various regular arrangements through shared oxygen atoms, to form an open crystal lattice containing uniform pores. Each aluminum atom within that lattice introduces one negative charge on zeolite framework which must be balanced by a positive charge of an exchangeable cation. After activation of zeolites, the exchangeable cations are located, in most cases, at preferred extra-framework sites within the voids formed by the lattice. These cations play a significant role in determining the adsorption properties of the particular zeolites. Moreover, zeolites have high chemical and thermal stability owing to their inorganic nature of the framework. Unlike zeolites, the structure of activated carbons mainly consists of elementary microcrystallites of graphite. These microcrystallites are stacked together in random orientation. The micropores are formed by the spaces between those microcrystallites, the diameter of which range from ~3Å to ~20Å. In addition, there may exist mesopores (20 to 500Å) and macropores (>500Å), as well. Therefore, activated carbon adsorbents generally show very little selectivity over molecules with different sizes. However, due to the nonpolar surface of carbon, an activated carbon tends to be hydrophobic and organophilic. With respect to carbon molecular sieves, their structure is similar to that of activated carbon in most general terms, but they have a very narrow distribution of micropore sizes ranging from about 3 to 9Å, for the various types, and thus they behave as molecular sieves.

Clearly, all of these materials, zeolites, activated carbon, and carbon molecular sieves, combine microporosity with high chemical and thermal stability, which are essential for gas separation and purification. Although it is difficult to design and build the microporous structures of these sieve materials with specific pore sizes in a systematic way, a wealth of structures is known by now. Variation of chemical formulation and functionality, however, meets limits due to complexity of phenomena and costs involved. The present invention is directed to novel microporous adsorbents which can be designed with specific pore sizes in a systematic way.

SUMMARY OF THE INVENTION

It is the primary object of the present invention to provide a novel class of microporous adsorbents for gas separation and purification.

It is another object of the present invention to provide practical applications of the microporous adsorbents of the present invention in gas separation and purification processes.

To achieve the foregoing objects and advantages and in accordance with the purposes of the invention as embodied and broadly described herein, a new class of microporous adsorbents comprises a metallo-organic polymer, which is characterized by a formula set forth below:

$$[R(L)_n]_m M_n,$$

wherein

R is an organic spacer;

L is a ligation group substituted on an organic spacer, e.g., carboxylate group, —C(=O)O⁻; dithiocarboxylate group, —C(=S)S⁻; and β-diketonate group, —C(=O)C(R')=C(—O⁻)—, R'=H; or an aliphatic or aromatic group;

n denotes the number of ligation group, n>2;

M denotes transition metal or rare earth metal, excluding Co, Cu, Zn, Tb when the organic spacer is a benzene ring, the ligation group is carboxylate, and n equals 2 or 3; and m denotes the oxidation state of transition metal.

Structural modification of the new class of microporous adsorbents can also be made to further enhance desirable functionalities. For example, the channel linings can be chemically functionalized using organic bases, or they can be doped with inorganic salts such as lithium, silver, copper (I/II) salts to create specific adsorption sites that are necessary for gas separation and purification.

Unlike zeolites, other microporous zeo-type materials and carbons, the new adsorbent materials provide unique surfaces which are comprised of carbon, hydrogen, oxygen and nitrogen atoms, and framework metal sites. Owing to their tunable organic and metallic parts of the microporous structures, they have advantages over presently utilized adsorbents in engineering of specific pore sizes and sorption sites in a systematic way. Therefore, along with zeolites, carbon molecular sieves and other carbonaceous adsorbents, this new class of adsorbents expand material selections for industrial gas separation applications.

DETAILED DESCRIPTION OF THE INVENTION

Figure 1:
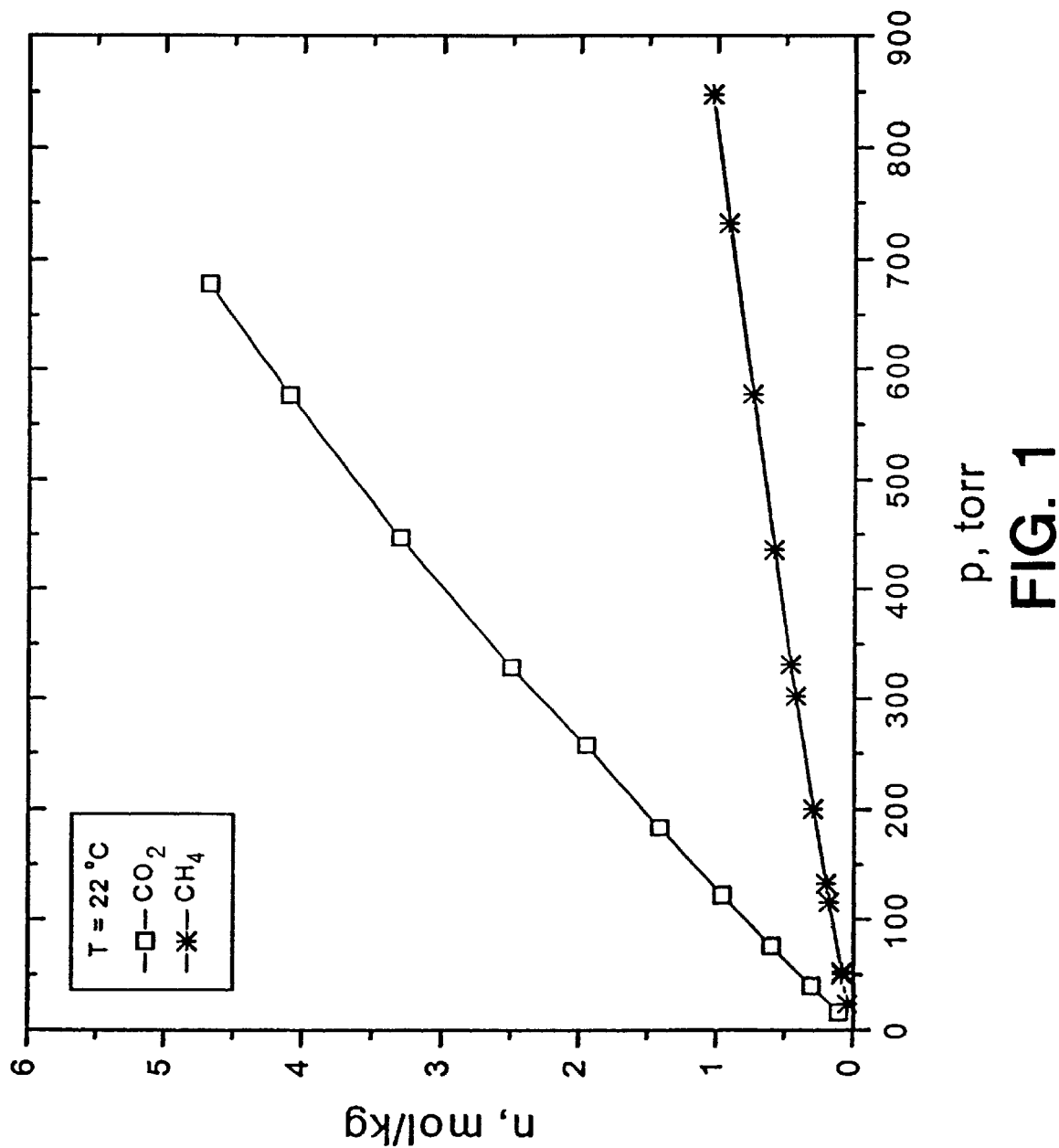
FIG. 1 is a graph of adsorption equilibrium data for the use of an adsorbent of the present invention for $CO_2$ and $CH_4$.

This invention relates to a new class of microporous adsorbents for use in gas separation and purification. In particular, for use in PSA PPU and TSA PPU processes for $CO_2$, $H_2O$, $N_2O$, and oil vapor removal from air, separation of hydrocarbon/$CO_2$ mixtures, and syngas. These microporous metallo-organic polymers can be produced by metal-ligand dative bonds from transition metal ions, and bi-, tri-, tetra-, or multicarboxylates, and the like, to form highly porous metal coordination polymers, which can be characterized by the following formula:

$[R(L)_n]_m M_n$, wherein

R is an organic spacer;

L is a ligation group;

n denotes the number of ligation group, n>2;

M denotes transition metal or rare earth metal; and m denotes the oxidation state of transition metal.

The spacer, R, can be chosen from any organic cyclic or acyclic systems. For example, systems with double bonds, benzene rings, or macrocyclic rings are considered. L is a ligation group substituted on an organic spacer. It can be chosen from carboxylate group, —C(=O)O$^-$; dithiocarboxylate group, —C(=S)S$^-$; and β-diketonate group, —C(=O)C(R')=C(—O$^-$)—, wherein R'=H, or an aliphatic or aromatic group. M can be I-VIIB metals including rare earth metals, and VIII metals, where the Roman numbers refer to the Periodic Table of Elements. Typically, they are Zn, Cu, Co, Ru, Os, and rare earth metals. However, in the case where the organic spacer is a benzene ring, and the ligation group is a carboxylate (n=2, 3), M excludes Co, Cu, Zn, Tb.

The following examples are given to demonstrate novel microporous adsorbents of the present invention characterized by the formula $[R(L)_n]_m M_n$, where the ligation groups are dithiocarboxylate and β-diketonate groups, such as

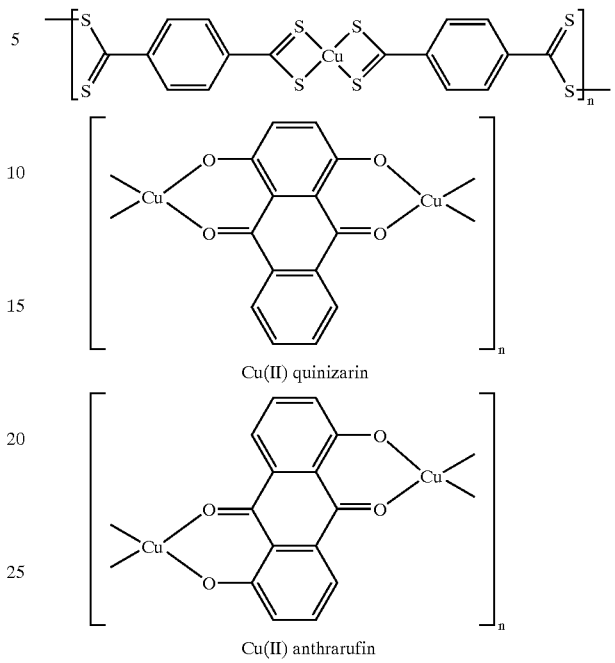

Cu(II) quinizarin

Cu(II) anthrarufin

Table 1 below sets forth, for illustrative purposes, various multicarboxylic acids suitable for use in the formation of the novel microporous adsorbents of the present invention characterized by the formula $[R(L)_n]_m M_n$,

TABLE 1

| Name | Structure |
| --- | --- |
| oxalic acid | HOOC–COOH |
| acetylene dicarboxylic acid | HOOC–C≡C–COOH |
| 2-carboxycinnamic acid | (4-carboxyphenyl)-CH=CH-COOH |
| 1,4-naphthalene-dicarboxylic acid | 1,4-naphthalene with two COOH groups |
| 2,6-naphthalene-dicarboxylic acid | 2,6-naphthalene with two COOH groups |

TABLE 1-continued

| Name | Structure |
| --- | --- |
| 1,1'-ferrocene-dicarboxylic acid | 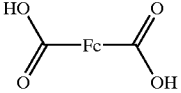 |
| porphyrin-(CO$_2$H)$_4$ | 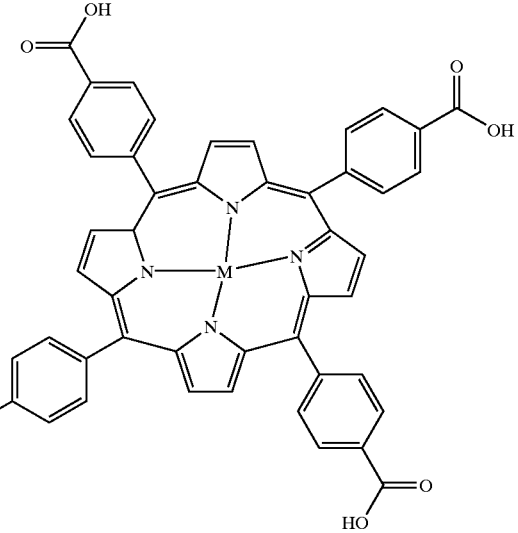 |
| porphyrin-(CO$_2$H)$_8$ | 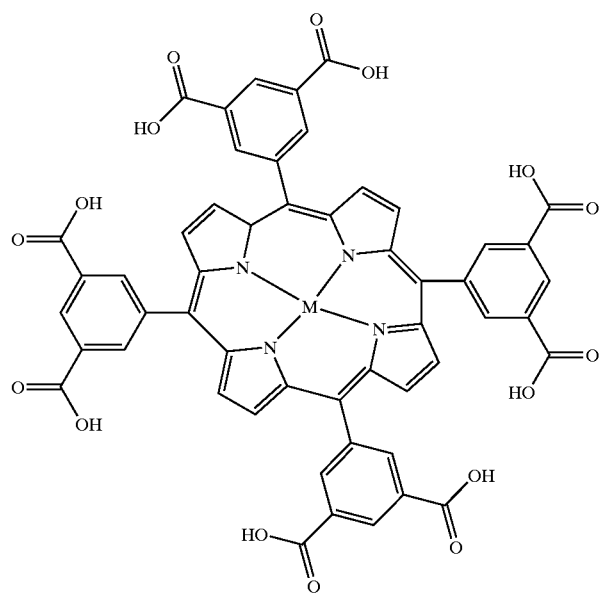 |

The microporous metallo-organic polymers of the present invention are either X-ray crystalline, amorphous or at the borderline of such crystallinity. In general, their micropore topologies are mostly different from those of the inorganic zeo-type ones, but in a number of cases they may be analogous to the latter, in terms of structural patterns. Important features of such adsorbents were a very narrow (homogeneous) pore size distribution, a high pore volume and the opportunity of tailoring the pore size, intentionally. Unlike zeolites, the channel linings can be functionalized chemically. They can also be doped comparatively easily with inorganic salts such as lithium, silver, or copper(I) salts or mixtures thereof, to create specific adsorption sites for gas separation and purification. For example, copper(I/II) metal salts can be supported on these adsorbents for their use as CO-selective adsorbents. In order to do so, a cuprous compound or a cupric compound, such as CuCl or CuCl$_2$, can be impregnated into a microporous metallo-organic framework such as that of copper (II) benzene-1,3,5-tricarboxylate, Cu-BTC, with the aid of solvents. The solvents include water, alcohol, acetone, ethyl acetate, acetonitrile. The most preferred solvents are water and alcohol.

It is envisioned that the novel microporous metallo-organic polymer adsorbents can be utilized in:

a) PSA PPU and TSA PPU for removal of CO$_2$, H$_2$O, N$_2$O, and oil vapor from air streams;

b) Removal (trapping) of heavy hydrocarbons, in particular compressor oil vapor, in $N_2$ PSA and $O_2$ VSA/PSA processes;
c) PSA/TSA processes for bulk phase removal of $CO_2$, $H_2O$ and high level of hydrocarbons (>$C_2$) from $CH_4$;
d) PSA/TSA processes for separation of hydrocarbon/$CO_2$ mixtures such as ethylene/$CO_2$;
e) PSA/TSA processes for bulk phase separation and purification of CO from $CO_2$, $CH_4$, $H_2$, $N_2$, $O_2$ and Ar;
f) Removal of $CO_2$ from $CO_2$/$C_2H_2$ mixtures (bulk and trace);
g) Separation of gaseous olefin/paraffin mixtures of low molecular weight, e.g., ethylene-ethane mixtures;
h) Drying agent and moisture sensor utilization.

The following examples are set forth below for illustrative purposes.

EXAMPLE 1

Preparation of copper(II) benzene-1,3,5-tricarboxylate (Cu-BTC)

Benzene-1,3,5-tricarboxylic acid (1 g, 4.76 mmol) was dissolved into ethanol (12 ml), and cupric nitrate hydrate ($Cu(NO_3)_2 \cdot 2.5H_2O$; 2 g, 8.60 mmol) was dissolved into ethanol (12 ml). The two solutions were mixed at ambient temperature for 30 minutes. Then they were poured into an autoclave with a 45-ml teflon cup. The autoclave was heated at 110° C. under hydrothermal conditions for 17 hours. The reaction vessel was cooled to ambient temperature, and then the blue hexagonal crystals of Cu-BTC were isolated by filtration, and washed with water. The product was dried at 110° C. overnight. The yield was 87%. Analysis by TGA showed that a fully hydrated product contained up to 40 wt. % water, and it was stable up to ca. 340° C.

Adsorption Equilibrium Properties for Gas Separation Processes

The Cu-BTC adsorbent of Example 1 was tested for its adsorption equilibrium properties and suitability in a number of gas separation processes. The adsorption data were obtained using a piezometric (constant volume–variable pressure) method at 22° C. The results of these tests are set forth in FIGS. 1 to 5.

FIG. 1 presents the adsorption equilibrium data for $CO_2$ and $CH_4$. The data demonstrates that the adsorbent can be used in separation of gaseous mixtures containing $CO_2$ and $CH_4$, such as syngas separations, due to preferential adsorption of $CO_2$.

Figure 2:
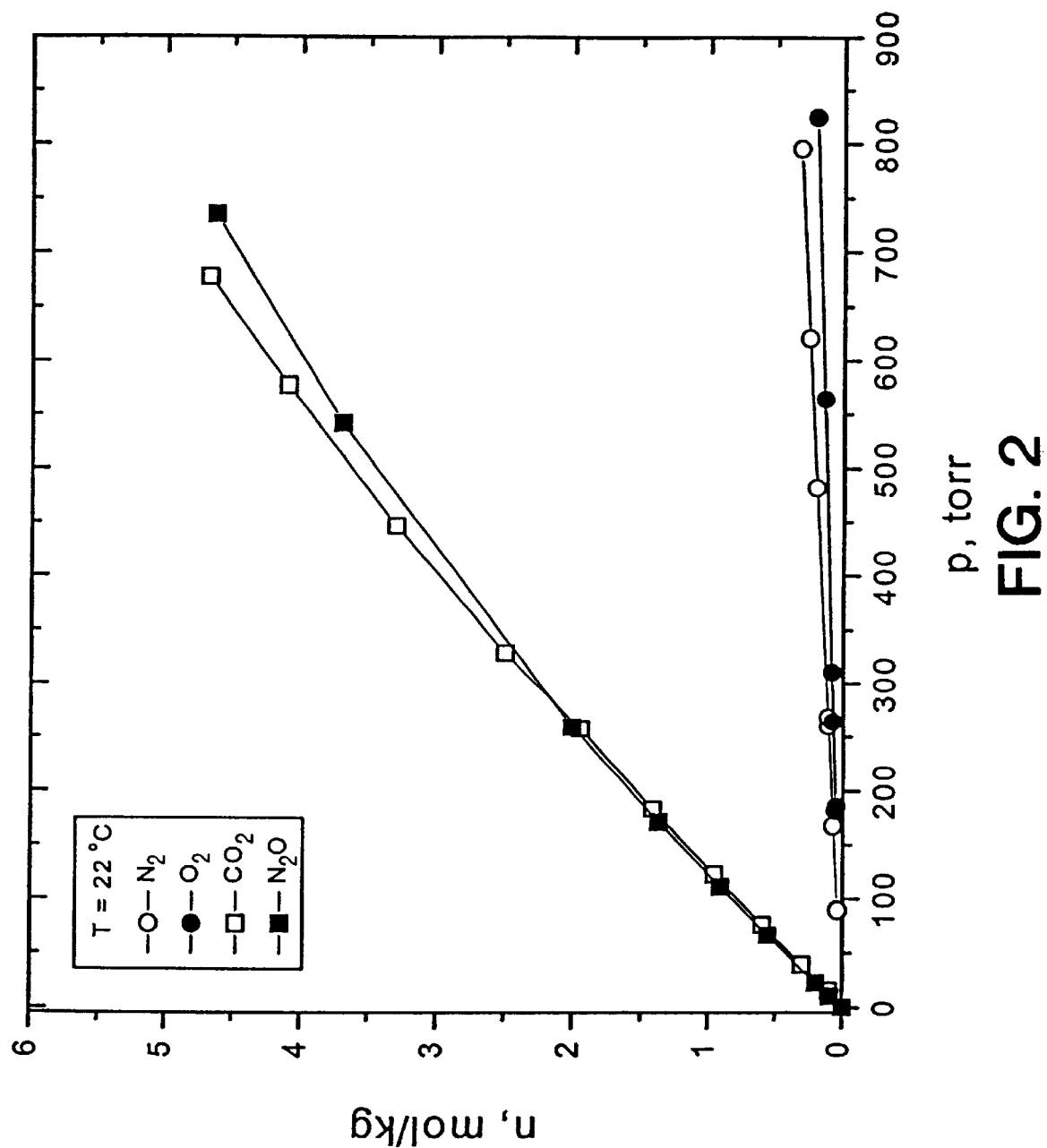
FIG. 2 is a graph of adsorption equilibrium data for the use of an adsorbent of the present invention for $N_2$, $O_2$, $CO_2$ and $N_2O$.

Adsorption equilibrium data for $N_2$, $O_2$, $CO_2$ and $N_2O$ on Cu-BTC sorbent are presented in FIG. 2. The data demonstrates that the adsorbent can be used in PSA PPU processes for removal of $CO_2$ and $N_2O$ from air streams, due to preferential adsorption of $CO_2$ and $N_2O$.

Figure 3:
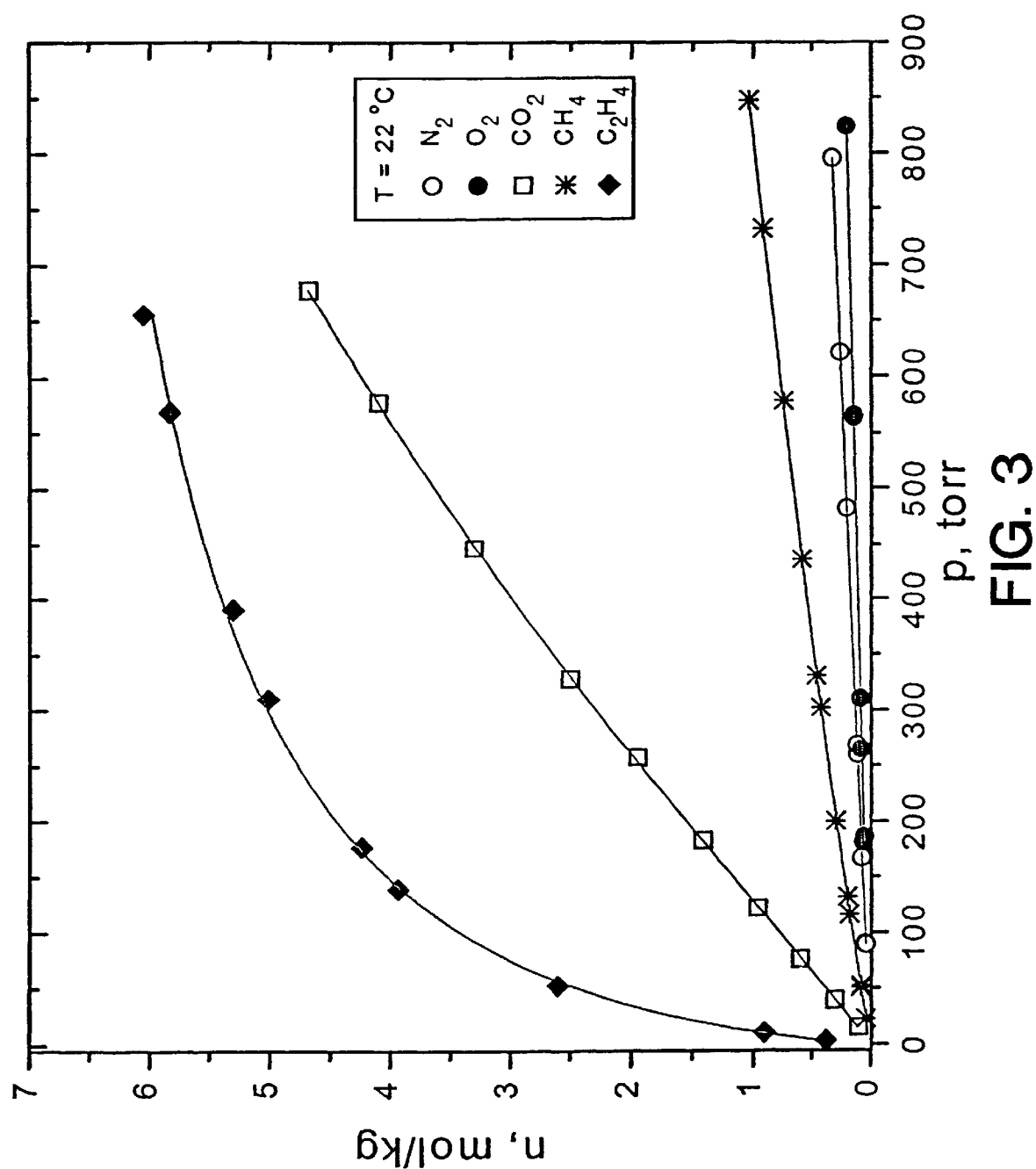
FIG. 3 is a graph of adsorption equilibrium data for the use of an adsorbent of the present invention for $N_2O_2$, $CH_4$, $CO_2$ and ethylene.

Adsorption equilibrium data for $N_2O_2$, $CH_4$, $CO_2$ and ethylene on Cu-BTC sorbent are presented in FIG. 3. The adsorption data demonstrates that the adsorbent preferentially adsorbing ethylene to other gases can be used in recovery of ethylene in ethylene partial oxidation processes.

Figure 4:
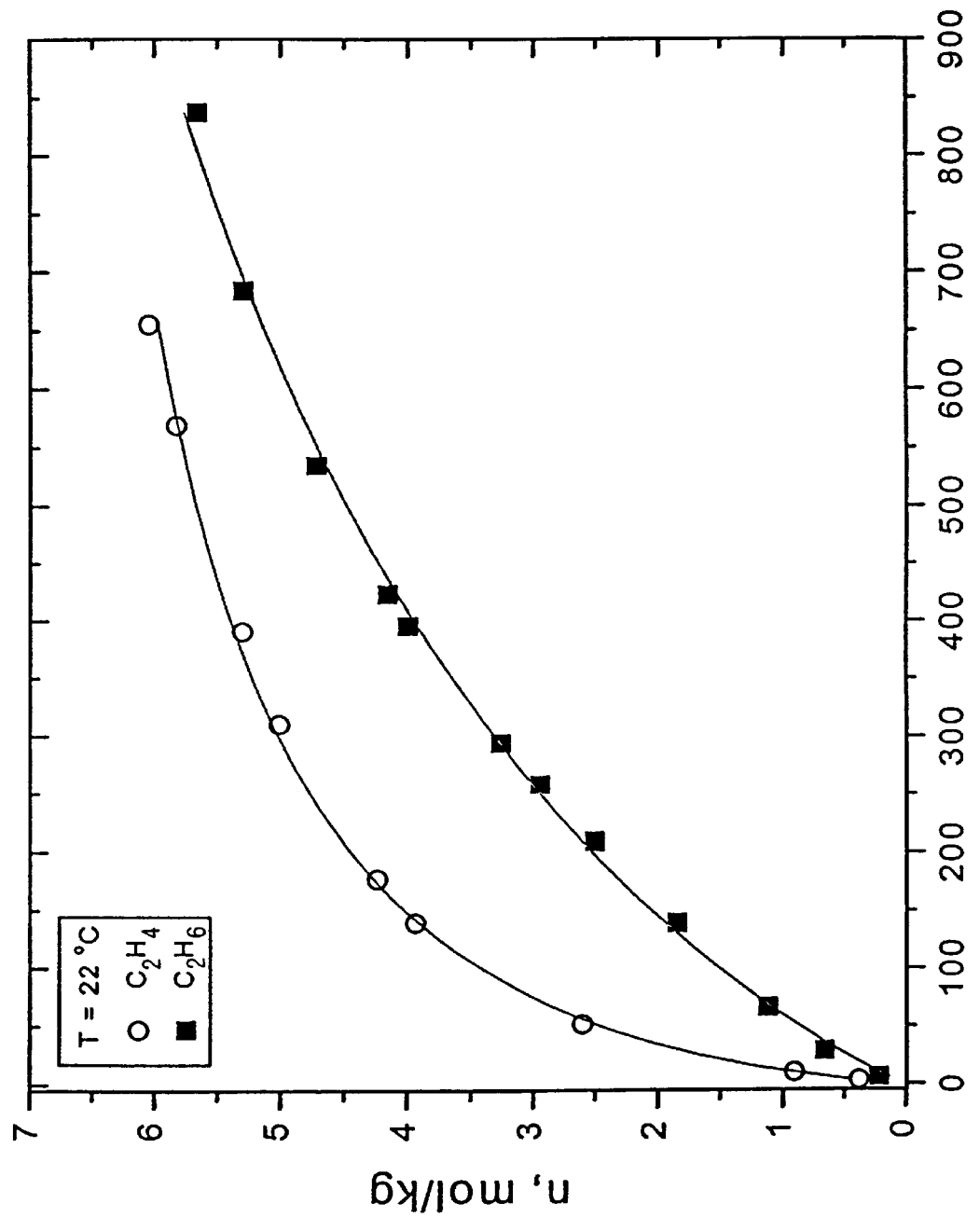
FIG. 4 is a graph of adsorption equilibrium data for the use of an adsorbent of the present invention for ethylene and ethane.

Adsorption equilibrium data for ethylene and ethane on Cu-BTC adsorbent are presented in FIG. 4. The adsorbent preferentially adsorbs ethylene as compared to ethane. It can also be used to separate other olefin/paraffin mixtures.

Figure 5:
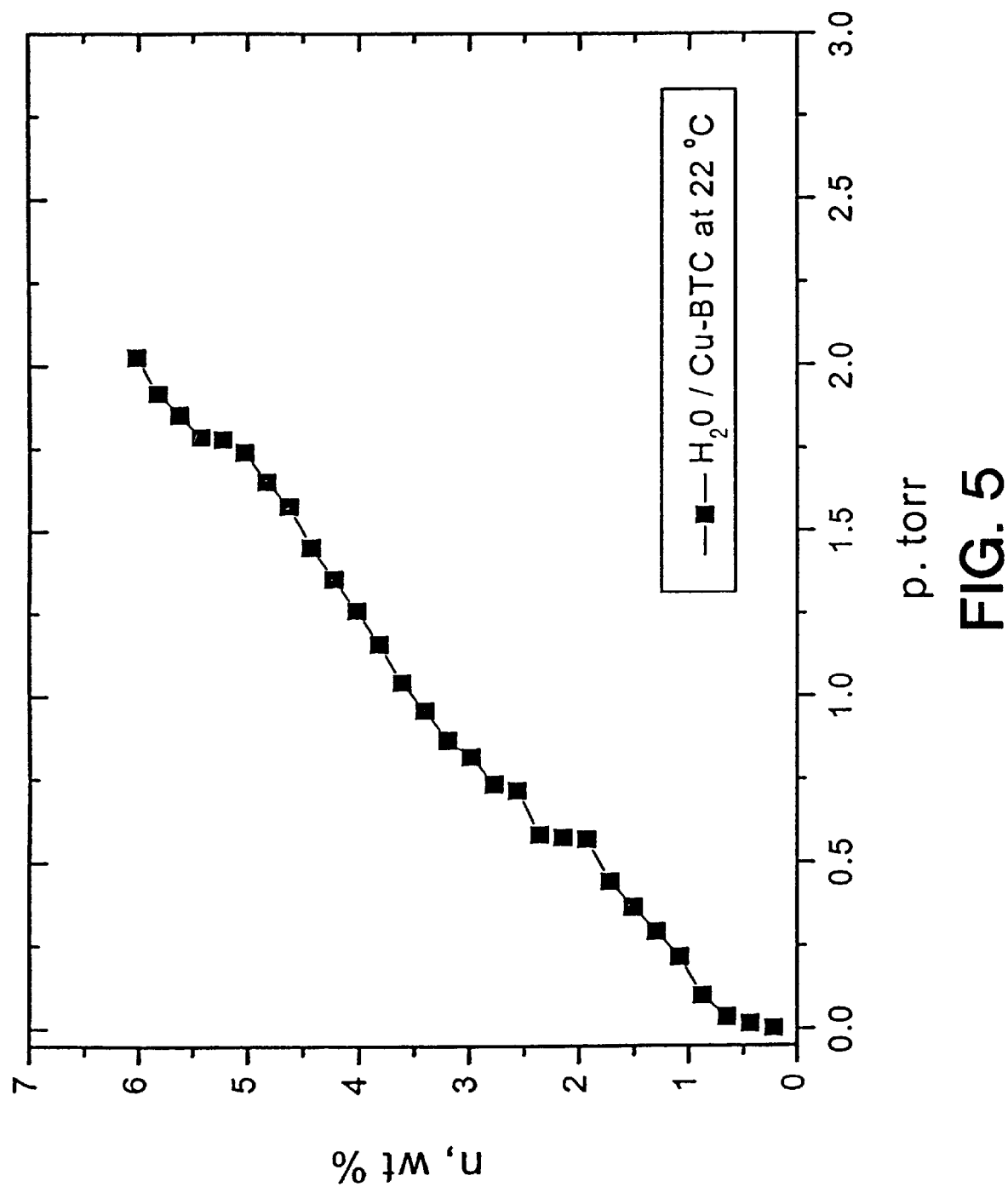
FIG. 5 is a graph of adsorption equilibrium data for the use of an adsorbent of the present invention for $N_2O$.

Adsorption equilibrium data for $H_2O$ on Cu-BTC sorbent are presented in FIG. 5. The adsorbent provides a very large saturation capacity for water, and its color changes from dark purple when it is dry to light blue when water is adsorbed. Thus, the material can be used both as a drying agent and as moisture sensor, and also as an adsorbent for moisture removal using PSA/TSA processes, such as in PPU processes upfront to cryogenic air distillation.

EXAMPLE 2

Impregnation of $CuCl_2$ into Cu-BTC for CO-Selective Adsorbent

Cu-BTC was dried at 150° C. for 4 hours before use. $CuCl_2 \cdot 6H_2O$ (1.22 g) were dissolved into absolute alcohol (20 ml). Cu-BTC (3 g) was then added to the solution. The mixture was stirred for 30 minutes using a magnetic stirrer before putting it in a mechanical shaker for 22 hours at ambient temperature. Next, all solvent was removed under a reduced pressure yielding a blue material. It was then dried at 110° .C under vacuum. The yield was 97%.

The adsorbent was heated at 190° C. under CO atmosphere for 3 hours and evacuated before the CO uptake test was performed on a microbalance. As a result, at 25° C., this adsorbent has a CO adsorption capacity of 1.08 mmol/g at a CO pressure of 984 mbar.

EXAMPLE 3

Oil Vapor Removal Test without Moisture

Sorbent beads of the metallo-organic polymer, made of Cu-BTC powder by shaping the latter at appropriate conditions, were evaluated for oil vapor removal from compressed air in an n-dodecane sorption breakthrough experiment.

About 94 gram of the adsorbent beads was packed in a 1" adsorbent vessel. A feed consisting of dry $N_2$ and about 10 ppm n-dodecane vapor at total pressure of 80 psia, temperature, 25° C., and flowrate, 100 scfh, was used in an sorption breakthrough experiment to determine the sorption capacity of the novel sorbent for n-dodecane. The sorbent takes up ca. 68 wt. % of n-dodecane at n-dodecane partial pressure, 0.04 torr, by a physical sorption process, before the n-dodecane concentration in the effluent stream reaches 1 ppm. This experiment proves that the new sorbent has an extremely large sorption capacity for hydrocarbons.

EXAMPLE 4

Oil Vapor Removal Test with Moisture

Similar n-dodecane sorption breakthrough experiments as described in Example 3 were also carried out with a moisture-saturated $N_2$ stream and an n-dodecane concentration therein, that amounts to 100 ppm. A sorption capacity of 1.85 wt. % was measured at an ndodecane partial pressure of 0.4 torr before the n-dodecane concentration in the effluent stream reaches 0.2 ppm. Thus, it has proven that the novel sorbent can still sorb a significant amount of hydrocarbons under conditions of relatively high humidity.

EXAMPLE 5

PSA cyclic experiments of 30 minutes feed and 30 minutes $N_2$ purge were also performed to demonstrate the regeneration properties of the novel sorbent. The feed step was carried out at a total pressure, 80 psia, temperature, 25° C., with both dry and moisture-saturated gas streams containing 10 ppm n-dodecane at a flow rate of 100 scfh. House nitrogen at a flowrate, 50 scfh, was used to purge the adsorber at 25° C. and 15.0 psia. Cyclic experimental results with both dry and wet gas streams as feed have shown that the sorbed amount of n-dodecane can be desorbed, and the sorbent was gradually regenerated in the PSA cycles with a purge-to-feed ratio of ca. 2.6 for both cases.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. An adsorbent composition comprising a metallo-organic polymer having the formula $[R(L)_n]_m M_n$ wherein R represents an organic spacer selected from the group consisting of an organic cyclic or acyclic compound; L represents a ligation group substituted on the organic spacer selected from the group consisting of carboxylate group, —C(=O)O$^-$; dithiocarboxylate group, —C(=S)S$^-$; and β-diketonate group, —C(=O)C(R')=C(—O$^-$)—, wherein R'=H, or an aliphatic or aromatic group; M represents a transition metal or rare earth metal selected from the group consisting of I to VIIB and VIII metals, except CO, Cu, Zn and TB when L is —C(=O)O$^-$; R is a benzene ring and n=2 or 3; m is the oxidation state of transition metal; and n is the number of the ligation group substituted on the organic spacer and said metallo-organic polymer is doped with lithium, silver or copper (I/II) salts or mixtures thereof.

2. A method for separating carbon dioxide, water, N$_2$O and hydrocarbons from a gas stream comprising passing said gas stream through an adsorbent zone containing a metallo-organic polymer having the formula $[R(L)_n]_m M_n$ wherein R represents an organic spacer selected from the group consisting of an organic cyclic or acyclic compound; L represents a ligation group substituted on the organic spacer selected from the group consisting of carboxylate group, —C(=O)O$^-$; dithiocarboxylate group, —C(=S)S$^-$; and β-diketonate group, —C=O)C(R')=C(—O$^-$)—, wherein R'=H, or an aliphatic or aromatic group; M represents a transition metal or a rare earth metal selected from the group consisting of I to VIIB and VIII metals; m is the oxidation state of transition metal; and n is the number of the ligation group substituted on the organic spacer and said metallo-organic polymer is doped with lithium, silver or copper (I/II) salts or mixtures thereof.

3. A method for removing hydrocarbons from a gas stream comprising passing said gas stream through an adsorbent zone which contains as an adsorbent a metallo-organic polymer having the formula $[R(L)_n]_m M_n$ wherein R represents an organic spacer selected from the group consisting of an organic cyclic or acyclic compound; L represents a ligation group substituted on the organic spacer selected from the group consisting of carboxylate group, —C(=O)O$^-$; dithiocarboxylate group, —C(=S)S$^-$; and β-diketonate group, —C(=O)C(R')=C(—O$^-$)—, wherein R'=H, or an aliphatic or aromatic group; M represents a transition metal or a rare earth metal selected from the group consisting of I to VIIB and VIII metals; m is the oxidation state of transition metal; and n is the number of the ligation group substituted on the organic spacer and said metallo-organic polymer is doped with lithium, silver or (I/II) salts or mixtures thereof.

4. A method for separating a component selected from the group consisting of ethylene and CO from a gas mixture containing CO$_2$, ethylene, CH$_4$, H$_2$, N$_2$, O$_2$ and Ar comprising subjecting said gas mixture to an adsorption process comprising the steps:

a) passing said gas mixture through at least one adsorbent zone containing an organo-metallic polymer as adsorbent at a selected temperature and pressure thereby preferentially adsorbing said component from said gas mixture; and b) regenerating said adsorbent at a temperature higher than said selected temperature, at a pressure lower than said selected pressure, or at both a temperature higher than said selected temperature and a pressure lower than said selected pressure; said organo-metallic polymer having the formula:

$[R(L)_n]_m M_n$, wherein R represents an organic spacer selected from the group consisting of an organic cyclic or acyclic compound; L represents a ligation group substituted on the organic spacer selected from the group consisting of carboxylate group, —C(=O)O$^-$; dithiocarboxylate group, —C(=S)S$^-$; and β-diketonate group, —C(=O)C(R')=C(—O$^-$)—, wherein R'=H, or an aliphatic or aromatic group; M represents a transition metal or a rare earth metal selected from the group consisting of I to VIIB and VIII metals; m is the oxidation state of transition metal; and n is the number of the ligation group substituted on the organic spacer and said metallo-organic polymer.

* * * * *